United States Patent [19]

Gribble

[11] Patent Number: 5,350,040
[45] Date of Patent: Sep. 27, 1994

[54] VIBRATION MONITORING LUBRICATION DEVICE

[76] Inventor: Douglas L. Gribble, 815 Sunrise La., Centralia, Wash. 98531

[21] Appl. No.: 835,121

[22] Filed: Feb. 12, 1992

[51] Int. Cl.$^5$ .............................................. F16N 21/00
[52] U.S. Cl. .................... 184/105.2; 184/105.3; 184/108; 73/593; 222/39; 340/682; 340/683
[58] Field of Search ............... 184/6.4, 108, 105.3, 184/105.2, 6.1, 105.1; 340/603, 682, 683; 73/593, 592, 622, 862.59, 861.18, 861.21, 861.23, 585, 587; 116/208; 222/23, 39

[56] References Cited

U.S. PATENT DOCUMENTS

| | | | |
|---|---|---|---|
| 1,996,063 | 4/1935 | Corkran | 340/682 |
| 3,218,852 | 11/1965 | Scarpa | 73/861.21 |
| 3,222,635 | 12/1965 | Simpkins et al. | 73/592 |
| 3,674,112 | 7/1972 | Roberts | 184/6.1 |
| 4,607,254 | 8/1986 | Carlson | 73/861.18 |
| 4,658,643 | 4/1987 | Nakayama et al. | 116/208 |
| 4,728,943 | 3/1988 | Vermeiren | 340/682 |
| 4,729,239 | 3/1988 | Gordon | 73/593 |
| 4,763,523 | 8/1988 | Womble et al. | 73/593 |
| 5,080,195 | 1/1992 | Mizumoto et al. | 184/6.1 |
| 5,140,858 | 8/1992 | Nishimoto et al. | 340/682 |

FOREIGN PATENT DOCUMENTS 0149611  7/1986  Japan ................................. 340/682

OTHER PUBLICATIONS

Hewlett Packard Operating and Service Manual entitled *Ultrasonic Translator Detectors* 118/4918A.
Hewlett Packard Operating and Service Manual entitled *Contact Probe Model* 18021A.

*Primary Examiner*—Carl D. Price
*Assistant Examiner*—Alan Cariaso

[57] ABSTRACT

A device for monitoring vibration of a bearing to assess whether other service is required. The device is adaptable for use with conventional grease guns and can be used simultaneously with lubrication of a bearing. The device includes an electric circuit and headphones which enable the wearer to "listen" to the bearing. Depending on the "bearing noise" that is heard, maintenance personnel can assess what further lubrication is required and what service is needed.

15 Claims, 4 Drawing Sheets

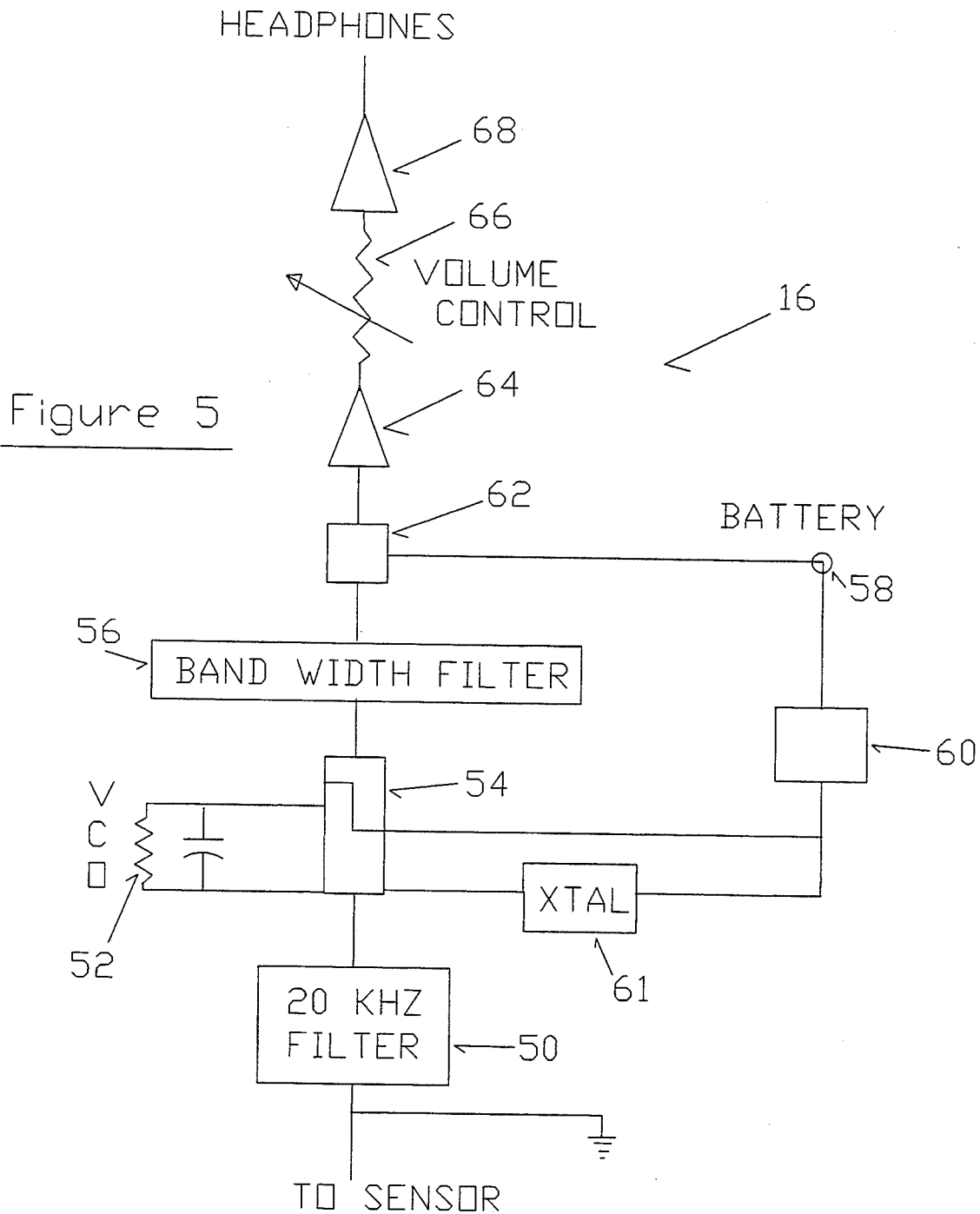

VIBRATION MONITORING LUBRICATION DEVICE

FIELD OF THE INVENTION

The present invention relates to ration monitoring equipment, particularly a portable ultrasonic monitor for monitoring bearings to assess whether servicing is required.

BACKGROUND OF THE INVENTION

The maintenance and inspection of bearings is typically performed by maintenance personnel whose maintenance and inspection schedule is based on predetermined time intervals between regular servicing and inspection. Typical maintenance of bearings involves greasing the bearings at regular intervals. Keeping the bearings greased is important to avoid bearing failure which can result in costly shutdowns. It is difficult for maintenance personnel to determine if a bearing has been over-greased or if it requires more grease. Over greasing a bearing can burst the bearing seal which can result in bearing failure. If a bearing is under greased, friction results in bearing temperatures that can cause bearing failure.

In addition to relying upon regular maintenance and servicing as a way of indirectly monitoring whether a bearing requires service, maintenance personnel can take advantage of bearing monitoring systems that rely upon vibration, frared, and ultrasonic principles. One device that relies upon vibration to monitor a bearing includes a hand-held probe, in the shape of a pointer, that is pressed against the bearing to monitor the vibration of the bearing. The probe is connected to a processing unit that converts the vibration into an audible signal. If the monitor indicates that the bearing requires servicing, maintenance personnel must pick-up their greasing or oiling equipment and lubricate the bearing. This type of probe does not allow maintenance personnel to easily monitor the bearing when it is being greased or oiled, accordingly, it is difficult for maintenance personnel to determine If the bearing has been over or under lubricated.

SUMMARY OF THE INVENTION

The present invention is a monitoring system that enables maintenance personnel to easily monitor a bearing before, during, and after lubrication. Accordingly, the problems associated with over or under lubricating a bearing can be avoided because the system can be used by maintenance personnel to determine when a sufficient mount of lubrication has been introduced to the bearing.

In one embodiment, the present invention is a device for assessing whether a bearing having a fitting for receiving lubricating material requires service. The device includes a coupling for introducing lubricating material into the bearing from a source of lubricating material. A sensor is attached to the coupling for detecting vibration of the bearing and producing an electric signal indicative of the vibration. The sensor can detect the vibration and produce the electric signal when the coupling is mated with the bearing.

In another embodiment the present invention is a device for monitoring a bearing that includes a sensor for detecting vibration and producing an electric signal indicative of the vibration. The sensor includes one end for receiving lubricating material from a source of lubricating material and a second end for dispensing lubricating material from the sensor. With both of these embodiments, an electric circuit can be provided that is capable of processing the electric signal produced by the sensor to provide an electric signal that can be converted into an audible signal that can be heard by the maintenance personnel using the sensor.

The system formed in accordance with the present invention allows maintenance personnel to use a single piece of equipment to both lubricate a bearing as well as assess the extent of lubrication and other service that the bearing may require. The system of the present invention is readily adaptable for use with conventional grease guns that are currently used to lubricate bearings.

BRIEF DESCRIPTION OF THE DRAWINGS

The foregoing aspects and many of the attendant advantages of this invention will become more readily appreciated as the sam become better understood by reference to the following detailed description, when taken in conjunction with the accompanying drawings, wherein:

FIG. 5 is a diagram of one embodiment of an electronic circuit that is one aspect of the vibration monitoring system formed in accordance with the present invention.

DETAILED DESCRIPTION OF THE PREFERRED EMBODIMENT

Figure 1:
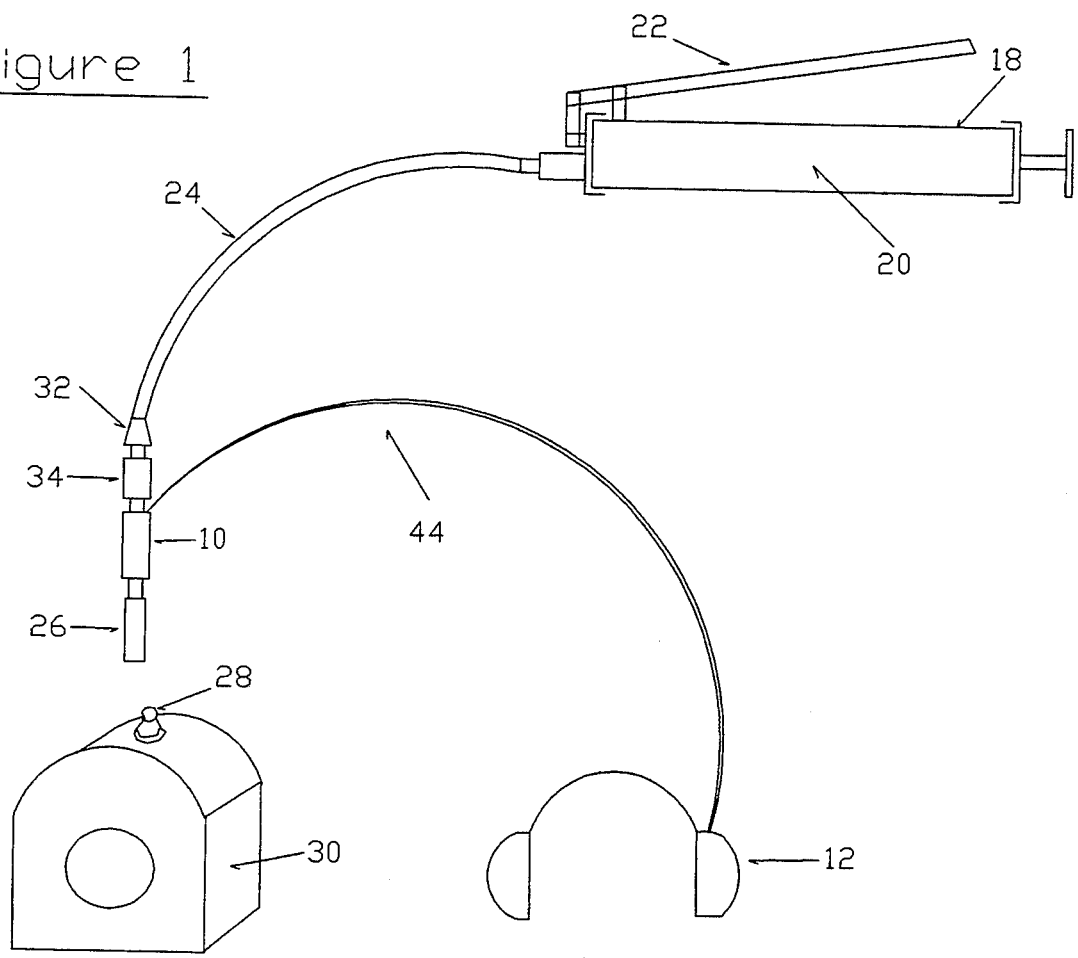
FIG. 1 is a perspective view of a grease gun which includes the vibration monitoring system formed in accordance with the present invention.

Referring to FIG. 1, a device or system formed in accordance with the present mention for detecting vibration In the illustrated embodiment. Includes a sensor (10) end a pair of headphone (12) that oar, be worn by maintenance personnel. Headphones (12) include an electric circuit (not shown) described herein below for processing the electric signal from sensor (10) to provide an electric signal which can be converted to an audible signal by a pair of headphones worn by maintenance personnel. The system is adapted to be used with a conventional grease gun (18) that includes canister (20) that acts as a source of lubricating material. Grease gun (18) includes handle (22) which when actuated serves to pressurize the canister and force grease through conduit (24) and sensor (10) and into coupling (26). Coupling (26) in the illustrated embodiment is a conventional grease gun coupling that mates with fitting (28) on bearing (30).

Figure 2:
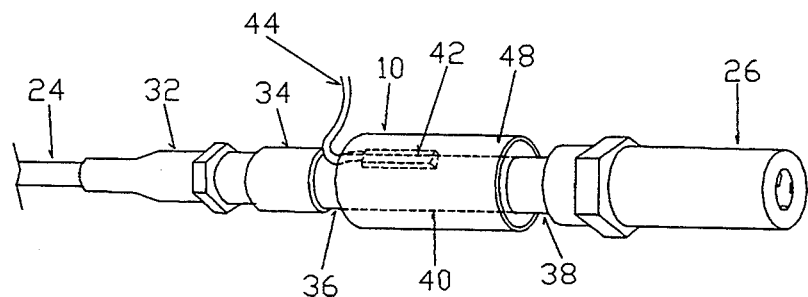
FIG. 2 is a perspective view or a portion to the vibration monitoring system formed in accordance with the present invention.

Referring to FIG. 2 for more detail, conduit (24) can be a tube made from a pliable material such as rubber. On one end, conduit (24) is attached to canister (20), for example, by a threaded fitting. On the end of conduit (24) opposite from the canister is metal fitting (32) that includes a male threaded tip. Such types of fittings are conventional and are used in conventional grease guns to allow couplings to be easily removed and serviced or exchanged for a different size or type of coupling.

Threaded coupling (34), includes a central bore and has female threads that can mate with the mate threads of fitting (32). Threaded coupling (34) is used to attach conduit (24) to sensor (10). Coupling (34) includes two sets of female threads, one set opening to one end of coupling (34) and the other set opening to the other end of coupling (34).

Sensor (10) includes a first end (36) for receiving lubricating material from coupling (34) and a second end (38) opposite the first end for delivering lubricating material out of sensor (10). The first and second ends of sensor (10) are threaded and dimensioned such that either end can mate with the female threads of coupling (34). Sensor (10) will be described in more detail below. In the illustrated embodiment, the threaded end of sensor (10) opposite the end that is attached to coupling (34) is attached to coupling (26), that as described above, is a conventional coupling used an grease guns to introduce grease into a bearing through a conventional fitting, commonly known as a "zerk."

Figure 3:
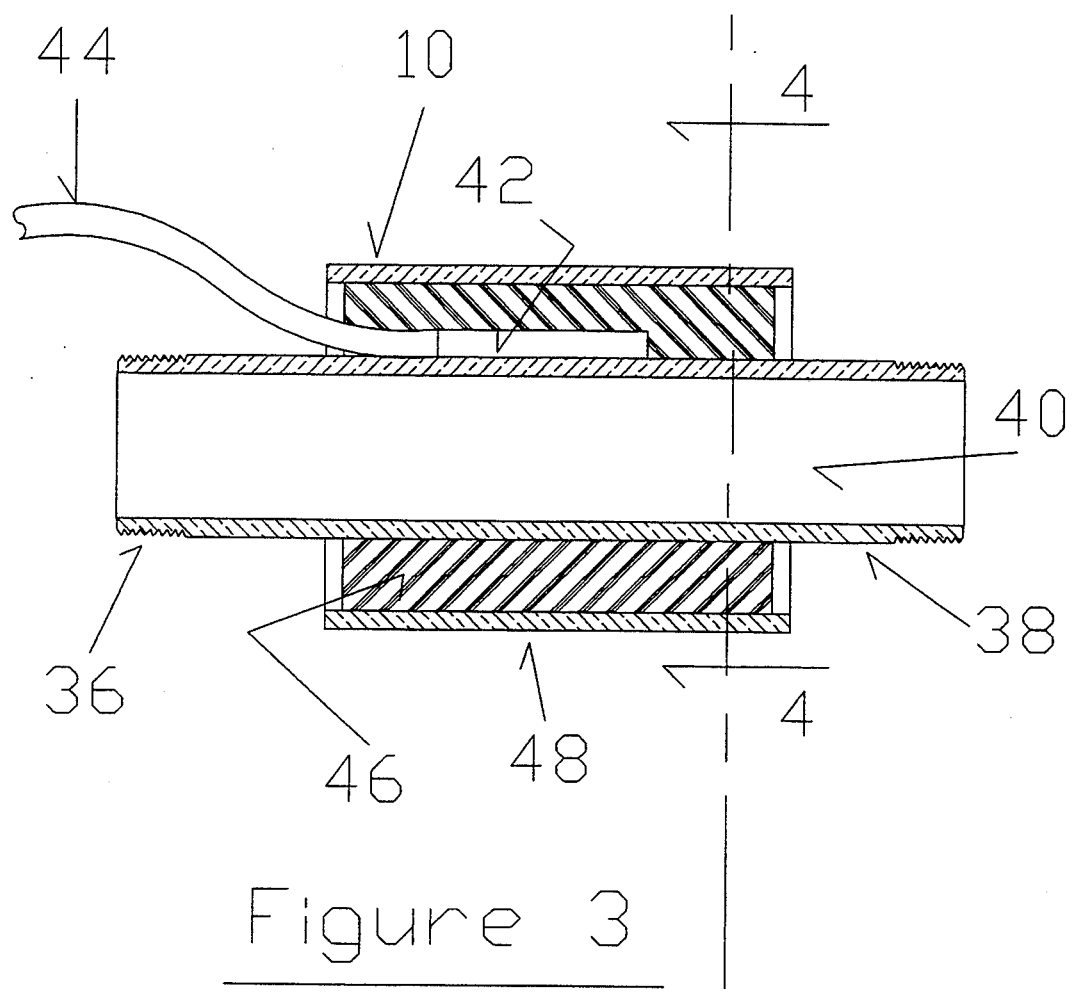
FIG. 3 is a cross-section of a sensor used in the vibration monitoring system in FIG. 2.
Figure 4:
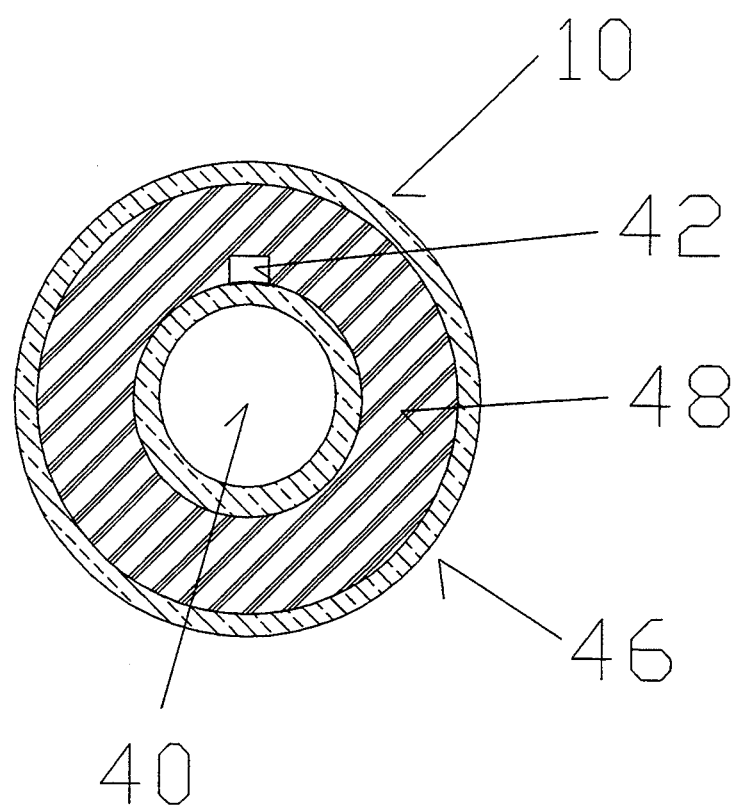
FIG. 4 is a cross-section taken along erie 4—4 in FIG. 2.

Referring to FIGS. 3 and 4 where more detail of sensor (10) is provided, In the illustrated embodiment, sensor (10) includes a tube (40) having a bore passing between its threaded first end (36) and threaded second end (38). Tube (40) is chosen from materials that are compatible with the grease gun and the lubricating material to be dispensed. The bore in tube (40) has a diameter such that the bore acts as a passage way for lubricating material between conduit (24) and coupling (26) without affecting the ability of the grease gun to introduce lubricating material into a bearing. One example of a suitable tube is a two inch length of one-eighth inch diameter brass pipe having both ends threaded.

Sensor (10) further includes transducer (42) affixed to the outer surface of tube (40) using, for example, an adhesive that does not compromise the ability of the transducer to detect vibration of tube (40). In this illustrated embodiment, transducer (42) is affixed to tube (40) near its longitudinal center. Transducer (42) is connected to shielded wire (44) that is electrically connected to an electric circuit for processing an electric signal from transducer (42) to provide an electric signal that can be converted to an audible signal as described herein below in more detail. Suitable means for attaching wire (44) to transducer (42) include low temperature solder. Transducer (42) produces an electric signal in response to mechanical stress, such as vibraton of tube (40). Suitable transducers are available from numerous commercial sources.

The particular frequency range preferred for transducer (42) should be chosen so that the transducer has a sensitivity for vibration frequency that provides the desired information about the service status of the bearing. It is also preferred that transducer (42) have a sensitivity range such that the chosen frequency range to be detected fans substantially in the middle of the sensitivity range. When the frequency range falls near the middle of the sensitivity range of the transducer, insensitivities near the boundaries of the transducer sensitivity range are avoided.

In the illustrated embodiment, the entire transducer (42) and a middle portion of the length of tube (40) are surrounded by an annulus of a non-conductive material (46). The encasement serves to protect transducer (42) and ensure that it continues to remain in contact with the outer Surface of tube (40). The annulus of non-conductive material (46) is encased within a metal sheath (48) for further protection and isolation from external vibrations.

Referring to FIGS. 1–2 and 3, in operation, the user of grease gun (18) can attach coupling (26) to fitting (28) on bearing (30). If present, vibration of hearing (30), e.g., rotation of a shaft in the hearing, within the frequency range of the transducer (42) will he transmitted to tube (40) because of the rigid connection between fitting 28, coupling (26) and tube (40). The vibration will result in transducer (42) producing an electrical signal that will be processed by the electronic circuit to provide an electrical signal that can be converted to an audible signal by a pair of headphones as described herein below in more detail. As maintenance personnel begin to grease the bearing, completion of the lubrication will he noted when the vibrational "noise" of the bearing changes, for instance, is damped out. If maintenance personnel, after placing the coupling on the fitting, hear no noise, this should indicate that no lubrication or only a small amount of lubrication is necessary. If the vibrational "noise" does not change after lubrication, then maintenance personnel can note the location of the bearing for further inspection.

Referring to FIG. 5, one embodiment of an electric circuit capable of processing the electric signal from transducer (42) is shown. The circuit is designed for use with a transducer having a Sensitivity in the 26 to 25 kHz range. The circuit includes a 20 kHz filter (50) that filters out frequencies less than about 18 kHz and more than about 22 kHz from the transducer signal. A voltage control oscillator (52) is provided to receive an input signal and produce an output signal whose frequency is proportional to the input signal. In the illustrated embodiment, voltage control oscillator (52) produces an output signal of about 20 kHz±5 kHz greater than the input signal. An integrated chip (54) is provided to mix the filtered signal from sensor 10 and the signal from voltage control oscillator (52). A bandwidth filter (56) is provided to filter the frequency of the output signal from integrated chip (54) to only allow through frequencies that am suitable for audio hearing by maintenance personnel with the aid of headphones. Generally, bandwidth filter (56) is set in the 0 to 4 kHz range. A battery (58) is provided to power the electric circuit. A voltage regulator (60) provides constant output voltage until battery (58) is depleted. In the illustrated embodiment, a crystal (61) sets an appropriate frequency"of about 8 kHz which is used by voltage control oscillator (52) to produce the above described output signal. A second integrated chip (62) processes the audio signal from bandwidth filter (56) and acts as a preamp for the signal. Another integrated circuit (64) is provided to provide additional amplification to the signal from integrated chip (62). Volume control (66) feeds the audio signal from integrated circuit (64) to an output amplifier integrated chip (68) and then to headphones (12) worm on the maintenance worker's head.

It is understood that the circuit described above illustrates one embodiment of many circuits that would be suitable for converting the electric signal produced by transducer (42) to an amplified signal in the audible range of frequencies. It should also he understood that other means for monitoring the signal produced by the transducer, such as other circuits and digital or analog readouts, would also he suitable.

While the preferred embodiment of the invention has been illustrated and described, it will he appreciated that various changes can be made therein without departing from the spirit and scope of tree invention. For instance, referring to FIG. 2. fitting (32) and coupling (34) are unnecessary it first end (36) of sensor (10) is attached directly to conduit (24).

The embodiments of the invention in which an exclusive property or privilege

Is claimed are defined as follows:

1. A device for assessing whether a bearing requiring periodic lubrication and having a fitting for receiving lubricating material requires service, the device comprising:

a coupling for introducing lubricating material into the bearing from a source of lubricating material; and a sensor attached to the coupling for detecting vibration and producing an electric signal indicative of the vibration of the bearing when the coupling is mated with the bearing wherein the sensor includes a tube for carrying the lubricating material and a transducer in contact with the tube for detecting the vibration of the bearing through the tube and producing the electric signal in response to the vibration.

2. The devices of claim 1, wherein the source of lubricating material is a grease canister and the coupling is a grease gun coupling.

3. The device of claim 2, further comprising a conduit between the sensor and the grease canister.

4. The device of claim 3, wherein the sensor includes a first end in fluid communication with the conduit.

5. The device of claim 4, wherein the sensor includes a second end opposite the first end, the second end including threads for mating with threads on the coupling.

6. The device of claim 1, wherein the tube and transducer are surrounded by a non-conductive, shock absorbent material and a rigid casing.

7. The device of claim 1, further comprising an electric circuit connected to the transducer for converting the electrical signal to an audible signal.

8. A device for monitoring vibration in a bearing requiring periodic lubrication comprising:

a sensor for detecting vibration in the bearing and producing an electrical signal indicative of the vibration, the sensor including a first end for receiving lubricating material from a source of lubricating material and a second end for dispensing the lubricating material from the sensor wherein the sensor includes a tube between the first and second ends for carrying the lubricating material and a transducer in contact with the tube for detecting the vibration of the bearing through the tube and producing the electrical signal in response to the vibration.

9. The device of claim 8, wherein the source of lubricating material is a grease canister.

10. The device of claim 9, further comprising a coupling for receiving lubricating material from the sensor and introducing it into the bearing.

11. The device of claim 10, further comprising a conduit between the sensor and the source of lubricating material.

12. The device of claim 11, wherein the first end includes threads for mating with threads on the conduit.

13. The device of claim 12, wherein the second end includes threads for mating with threads on the coupling.

14. The device of claim 8, wherein the tube and transducer are surrounded by a non-conductive, shock absorbent material and a rigid casing.

15. The device of claim 8 further comprising an electronic circuit for converting the electrical signal to an audible signal.

* * * * *